H. S. Ross,
Baggage Check.
No. 78,394.                 Patented May 26, 1868.
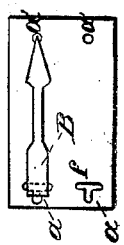
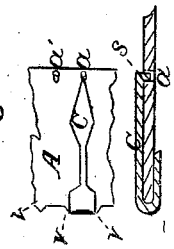
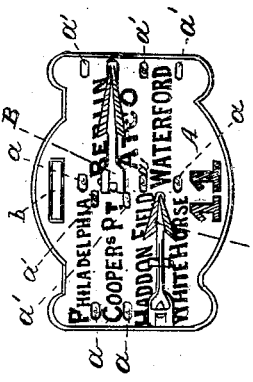
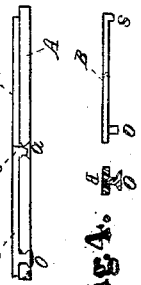
Witnesses      H. Schuyler Ross, Inventor

United States Patent Office.

H. SCHUYLER ROSS, OF BUFFALO, NEW YORK, ASSIGNOR TO CHARLES G. ROSS, OF NEW YORK CITY.

*Letters Patent No. 78,394, dated May 26, 1868.*

IMPROVEMENT IN BAGGAGE-CHECKS.

*The Schedule referred to in these Letters Patent and making part of the same.*

TO ALL WHOM IT MAY CONCERN:

Be it known that I, H. SCHUYLER ROSS, of the city of Buffalo, county of Erie, and State of New York, have invented a new and improved Baggage or Express-Check, and mode of pointing out the destination and place of departure of any baggage, parcel, or package, to be transported from one place to another; and I do hereby declare that the following is a clear and exact description of the same, reference being had to the annexed drawings, making a part of this specification, in which—

Figure 1 is a front elevation of my invention,

Figure 2 is a side elevation of the same,

Figure 3 is a horizontal section of the same,

Figure 4 is an end and side view of a part of my invention, and

Figures 5, 6, and 7 are modifications of my invention.

Similar letters of reference indicate corresponding parts.

The nature of my invention consists in providing a plate, with all or a part of the names of any desired route or road engraved or stamped upon the same, in two or more columns, either consecutively or alphabetically, using one or both sides of such plate for the same, and, further, in punching or drilling, at or opposite each name on said plate, holes or bevelled slots.

My invention further consists in providing indexes or pointers, with suitable projections or lugs upon the same, which will engage or secure such pointer or index to the said plate or check, by means of the aforesaid slots or holes; one of the said indexes or pointers, when so secured, pointing directly to or at a name or station to which the baggage or parcel is to be sent, and the second or smaller pointer pointing away from the name or station from which such baggage was sent or departed from; thus showing at once, not only the place of destination of any baggage or parcel, but also the place from whence it came.

The aforesaid pointers or indexes being so constructed that they cannot be detached from such plate by rough usage or handling, but easily removed by a person instructed in the manner of doing so.

My invention further consists in so arranging the names of the stations, in columns, that any pointer or index will not interfere with or wholly cover any name on said plate, when in its proper position.

The check or plate is to be attached to the baggage or parcel by means of a strap passed through a slot in said check or plate, as is usual with checks in present use, or attached in any other desired manner.

To enable others skilled in the art to make and use my invention, I will proceed to describe its construction and operation.

The check A consists of a flat plate of metal, or other suitable material, and the names or stations are stamped or engraved upon it in rows or columns, using both sides if necessary, and the names so arranged in relation to each other, that no name in one column shall be in line with any of the opposing column, as shown.

Opposite each name are cut two slots, $a\ a'$, with bevelled edges, such slots to be the same distance from each other as the length of space allotted to each name.

The number (11) of the check or plate is engraved or stamped at the bottom of such check, as shown in fig. 1, and a small pocket-check, with the number (11) engraved or stamped upon it, is to be given to the person desiring his baggage to be transported.

The pointers or indicators B and C are constructed of metal or other suitable material, each of different shape or form, the largest of which, C, is to indicate or point to a name, and the smaller one, B, to point away from a name or station on said plate.

The indicators or pointers are attached to and removed from said plate or check A by means of two projections, O and S, on the under sides of the same, in combination with the bevelled slots $a\ a'$ of the plate or check A. The said projections are the same distance asunder as the said holes or slots $a\ a'$, the projection O having a bevelled flanged head, as shown in fig. 4, and the projection S being simply a point or short lug at the end of said indicator or pointer.

The pointers B and C are attached to the plate A, by first entering the flanged head O into the slot desired, and then turning the pointer until the projection S enters the opposing slot.

I do not confine myself to the particular construction of the pointers described, as their construction can be easily modified, as in fig. 5, in which the pointer is a bent or U-shaped strip of metal, with a hook, S, at its end. This pointer can be slipped on the check, as shown, the check being provided with projections, V V, at its edge, and holes, $a$ $a'$, at or near the centre, to retain the pointer C in position.

Fig. 6 shows another modification of the pointer B, which being slightly curved, as shown, and having a T-shaped head, O, beneath and near the centre of the same, and at right angles, it can be inserted in slot $a$, pressed down, turned at right angles with its first position, when it will be retained properly in place; or instead of a T-head on the projection O, it can have a thread cut upon the same, and a hole with thread substituted for the slot $a$, when the pointer's projection, O, can be screwed into the said hole until the head or pointer bears upon the surface of the plate or check.

Fig. 7 is another modification, the slot $a$ having another slot, $f$, at right angles to itself, and at its end. The head of projection O can be inserted in the slot $f$, and the pointer B pushed until its point S enters the opposing slot $a'$.

What I claim, and desire to secure by Letters Patent, is—

1. The combination of a baggage-check, containing many names and perforations, with a separate and detachable pointer or indicator, substantially as herein specified.

2. A detachable metallic index or pointer, so constructed as to securely retain a given position upon a baggage-check, containing many names and perforations, substantially as and for the purpose specified.

H. SCHUYLER ROSS.

Witnesses:
  JOHN J. CRUISE,
  M. M. LIVINGSTON.